(12) United States Patent
Huffman et al.

(10) Patent No.: US 6,915,387 B1
(45) Date of Patent: Jul. 5, 2005

(54) SYSTEM AND METHOD FOR HANDLING UPDATES TO MEMORY IN A DISTRIBUTED SHARED MEMORY SYSTEM

(75) Inventors: William A. Huffman, Los Gatos, CA (US); Jeffrey S. Kuskin, Mountain View, CA (US)

(73) Assignee: Silicon Graphics, Inc., Mountain View, CA (US)

( * ) Notice: Subject to any disclaimer, the term of this patent is extended or adjusted under 35 U.S.C. 154(b) by 590 days.

(21) Appl. No.: 09/910,589

(22) Filed: Jul. 20, 2001

Related U.S. Application Data

(60) Provisional application No. 60/219,929, filed on Jul. 20, 2000.

(51) Int. Cl.[7] ............................................. G06F 12/08
(52) U.S. Cl. ...................... 711/145; 711/143; 711/119; 711/158
(58) Field of Search .................. 711/145, 143, 711/119, 158

(56) References Cited

U.S. PATENT DOCUMENTS

| | | | |
|---|---|---|---|
| 5,537,569 A | 7/1996 | Masubuchi | |
| 5,606,686 A | 2/1997 | Tarui et al. | |
| 5,680,576 A | 10/1997 | Laudon | |
| 5,943,685 A | 8/1999 | Arimilli et al. | |
| 5,950,226 A | 9/1999 | Hagersten et al. | |
| 5,963,974 A | 10/1999 | Arimilli et al. | |
| 6,073,211 A | 6/2000 | Cheng et al. | |
| 6,167,489 A | 12/2000 | Bauman et al. | |
| 6,192,452 B1 | 2/2001 | Bannister et al. | |
| 6,263,404 B1 | 7/2001 | Borkenhagen et al. | |
| 6,279,084 B1 | 8/2001 | VanDoren et al. | |
| 6,338,122 B1 | 1/2002 | Baumgartner et al. | |
| 6,389,516 B1 | 5/2002 | Nunez et al. | |
| 6,430,658 B1 | 8/2002 | Nunez et al. | |
| 6,631,447 B1 | 10/2003 | Morioka et al. | |
| 6,636,950 B1 * | 10/2003 | Mithal et al. ................ | 711/147 |
| 6,704,842 B1 | 3/2004 | Janakiraman et al. | |

OTHER PUBLICATIONS

Culler, et al. "Parallel Computer Architecture", 1999 Morgan Kaufmann Publishers, 2 cover pages, pp. 553–589.
Handy, "The Cache Memory Book", 1998, Academic Press, 2nd ed. pp. 147–155.

* cited by examiner

Primary Examiner—Reginald G. Bragdon
(74) Attorney, Agent, or Firm—Baker Botts L.L.P.

(57) ABSTRACT

A processor (100) in a distributed shared memory computer system (10) receives ownership of data and initiates an initial update to memory request. A front side bus processor interface (24) forwards the initial update to memory request to a memory directory interface unit (22). The front side processor interface (24) may receive subsequent update to memory requests for the data from processors co-located on the same local bus. Front side bus processor interface (24) maintains a most recent subsequent update to memory in a queue (102). Once the data has been updated in its home memory (17), the memory directory interface unit (22) sends a writeback acknowledge to the front side bus processor interface (24). The most recent subsequent update to memory request in the queue (102) is then forwarded by the front side bus processor interface (24) to the memory directory interface unit (24) for processing.

20 Claims, 3 Drawing Sheets

SYSTEM AND METHOD FOR HANDLING UPDATES TO MEMORY IN A DISTRIBUTED SHARED MEMORY SYSTEM

RELATED APPLICATIONS

This application claims the benefit of U.S. Provisional Application Ser. No. 60/219,929 filed Jul. 20, 2000.

TECHNICAL FIELD OF THE INVENTION

The present invention relates in general to multiprocessor computer, systems and more particularly to system and method for handling updates to memory in a distributed shared memory system.

BACKGROUND OF THE INVENTION

A type of conventional processor used in computer systems has an operation called an implicit write back. An implicit writeback initially occurs when a processor obtains ownership of data from another processor that has modified the data. The implicit writeback operation allows for the updating of the data in memory without losing the modification made by the previous owner of the data. As multiple processors in a node may be passing ownership of the data back and forth to each other, many implicit writeback operations may be initiated. A large number of outstanding implicit writeback operations directed to common data and memory address may degrade operation of the computer system. Therefore, it is desirable to improve the operating efficiency of the computer system.

SUMMARY OF THE INVENTION

From the foregoing, it may be appreciated by those skilled in the art that a need exists for a technique to prevent numerous implicit writeback from clogging up the pipeline of a computer system. In accordance with the present invention, a system and method for handling updates to memory in a distributed shared memory system are provided that substantially eliminate or reduce disadvantages and problems associated with conventional memory update techniques.

According to an embodiment of the present invention, there is provided a method for handling updates to memory in a distributed shared memory system that includes receiving ownership of data at a processor. Upon receiving ownership, the processor initiates an update to memory request for the data. The update to memory request is forwarded to a memory directory associated with a home memory for the data. Subsequent updates to memory requests for the data may be initiated by the processor prior to processing of the initial update to memory. A most recent one of the subsequent updates to memory request is maintained. An update acknowledgment is received from the memory directory indicating that the data has been updated in its home memory. Upon receiving the update acknowledgment, the, most recent subsequent update to memory request is forwarded to the memory directory for processing.

The present invention provides various technical advantages over conventional memory update techniques. For example, one technical advantage is to only process a most recent writeback after an implicit writeback. Another technical advantage is to discard intermediate writeback requests and not clog up the computer system by processing them. other technical advantages may be readily apparent to those skilled in the art from the following figures, description, and claims.

BRIEF DESCRIPTION OF THE DRAWINGS

For a more complete understanding of the present invention and the advantages thereof, reference is now made to the following description taken in conjunction with the accompanying drawings, wherein like reference numerals represent like parts, in which.

DETAILED DESCRIPTION OF THE INVENTION

Figure 1:
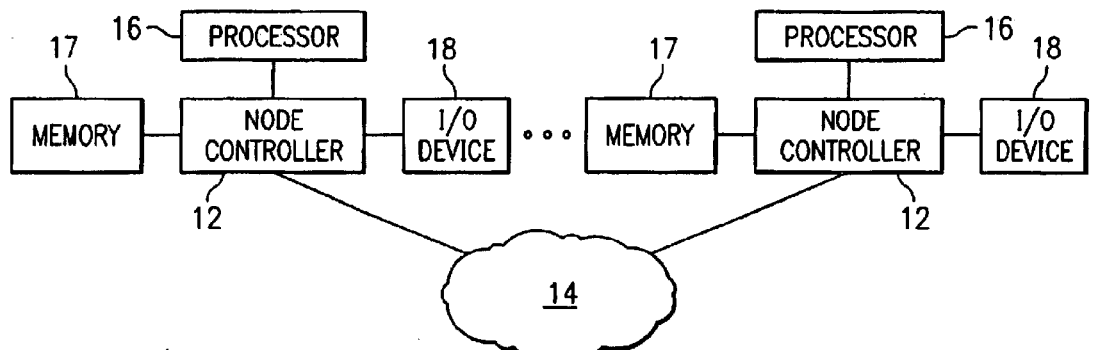
FIG. 1 illustrates a block diagram of a distributed shared memory computer system.

FIG. 1 is a block diagram of a computer system 10. The computer system 10 includes a plurality of node controllers 12 interconnected by a network 14. Each node controller 12 processes data and traffic both internally and with other node controllers 12 within the computer system 10 over the network 14. Each node controller 12 may communicate with one or more local processors 16, a local memory device 17, and a local input/output device 18.

Figure 2:
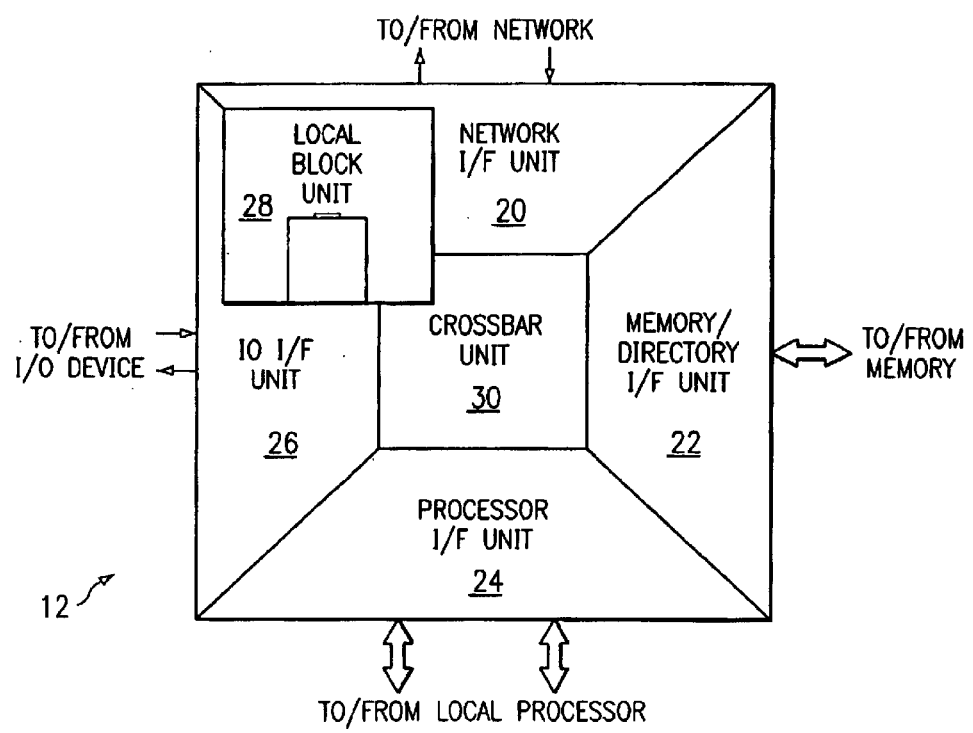
FIG. 2 illustrates a block diagram of a node in the distributed shared memory computer system.

FIG. 2 is a block diagram of the node controller 12. The node controller 12 includes a network interface unit 20, a memory directory interface unit 22, a front side bus processor interface unit 24, an input/output interface unit 26, a local block unit 28, and a crossbar unit 30. The network interface unit 20 may provide a communication link to the network 14 in order to transfer data, messages, and other traffic to other node controllers 12 in computer system 10. The front side bus processor interface unit 24 may provide a communication link with one or more local processors 16. The memory directory interface unit 22 may provide a communication link with one or more local memory devices 17. The input/output interface unit 26 may provide a communication link with one or more local input/output devices 18. The local block unit 28 is dedicated to processing invalidation requests and handling programmed input/output operations. The crossbar unit 30 arbitrates the transfer of data, messages, and other traffic for the node controller 12.

Each processor 16 includes at least one cache to temporarily store data from any memory 17 within system 10. Data is typically stored in a cache of processor 16 as individual cache lines of 132 bytes each that include 128 bytes of data and 4 bytes of directory information including its state and other control information pertaining to the data associated with the cache line. The directory information includes everything which needs to be known about the state of the cache line in the system as a whole and the data portion holds the data associated with the cache line unless another part of the system has a current copy of the cache line before it has been updated in the memory. Memory directory interface unit 22 includes memory references to data stored within its corresponding memory and what processors within system 10 have a copy of that data. Processor 16 may request data from any memory 17 within system 10 through accesses to the memory directory interface unit 22 corresponding to the memory containing the data. If the data is held in the cache of another processor, the data may be retrieved from that other processor according to a protocol scheme implemented within system 10. Memory directory interface unit 22 responds to incoming messages from any where, within system 10 and updates the state of a particular cache line and generates messages in response to the incoming messages.

System 10 accesses memory resident data and system state and reliably shares data between cooperating processor nodes and/or peer input/output nodes through a protocol scheme. The protocol scheme is specified through four correlated attribute sets. The attribute sets are the transient and stable sharing state associated with each parcel of data as viewed at its home location, the transient and stable state associated with each remote copy of a parcel of data, the specific request and response message types used in communications between entities within system 10, and the action taken in response to these messages. Actions taken may include state transitions, bus transactions, and reply messages.

Four subset protocols may be included in the overall system protocol scheme. These protocols include a memory protocol for the coherent or non-coherent access to main memory resident data, a programmed input/output protocol for access to miscellaneous system state and control mechanisms, a graphics flow control protocol for applying localized flow control on a processor which is streaming writes to a graphics peripheral, and an administrative protocol for use in maintenance and configuration procedures and for implementation specific functionality. The memory protocol requires no network ordering of any kind. Messages may be freely reordered even within a single virtual channel between a single source and destination. The programmed input/output protocol uses a hybrid network ordering technique. PIO request messages are delivered in order from a particular source to a particular destination. This ordering is preserved even for PIO request messages to different addresses. Thus, all PIO request messages from a source node to a particular destination node are delivered in the same order in which they are sent regardless of whether the destination for the message has the same or different address. PIO reply messages require no network ordering as they may be delivered to the originating node in an order different from that in which they were sent by the target of the PIO request message. The graphics flow control protocol uses the same hybrid network ordering technique as the programmed input/output protocol. Administrative messages require no network reordering of any kind and may be freely reordered as in the memory protocol.

The protocol scheme is a non-blocking request/reply protocol technique preferably optimized for the processor 16 front side bus and cache coherence implementation. The protocol scheme extends the Modified/Exclusive/Shared/Invalid (MESI) cache coherence protocol, used to maintain coherence within an individual processor bus, throughout system 10. The technique maintains coherence related sharing state for each cache line sized parcel of physical data in a special directory structure. The state of remotely held copies of a cache line is maintained in a similar fashion at the remote locations using a cache to hold the current copy of the cache line, its address tag, and its current state.

Various features are provided by the protocol scheme. Messages that cannot be serviced when they reach the memory are NACK'd rather than stalled or buffered in order to provide the non-blocking functionality. Two virtual channels are used—one for request and one for reply messages. Messages may be arbitrarily reordered within system 10. Three hop forwarding of dirty data may be provided directly from the owner of the data to the requester as long as sufficient network resources are available. Each request message includes an echo field whose contents are returned with every reply message associated with the original request message. Dynamic backoff is supported to restrict the request/reply protocol during network congestion. Implicit writebacks are handled and all forms of writebacks are acknowledged. Private data optimization is provided wherein lines may be requested read shared but exclusive is preferred if convenient. Non-allocating reads (get operations) and out of the blue cache line writes (put operations) allow for intra-cluster page migration and block copies and inter cluster communications. Silent drops of clean exclusive (CEX) and shared (SHD) data in processor caches are provided as well as CEX replacement hints. Also, fairness and starvation management mechanisms operate in conjunction with the core protocol scheme to increase message service fairness and prevent message starvation.

Other features include exclusive read-only request messages that retrieve data in a read-only state but also removes it from all sharers in the system. This operation is preferably used for input/output agent prefetching as it permits any node in system 10 to receive a coherent copy of a cache line. An input/output agent may also guarantee to self-invalidate an exclusive read-only line from its cache after a certain period of time through a timed input/output read in order to eliminate a need for the directory to send an invalidate request message to the input/output agent. This feature optimizes the expected input/output prefetching behavior and adds additional RAS resiliency in that a missing invalidate acknowledgment from an input/output agent can be ignored once the timeout period has elapsed.

Directory state is maintained in separate directory entries for each cache-line in the main resident memory. Each entry contains a line state representing a fundamental sharing state of the cache line, a sharing vector tracking which nodes and processors have a copy of the cache line in question, a priority field specifying the current priority of the directory entry for use in the fairness/starvation mechanism, and a protection field determining what types of accesses are permitted and from which nodes.

In this embodiment, the directory tracks 29 different states for each cache line. Fewer or more states may be tracked as desired for a particular implementation. Table I provides an example of the different states. Of the states listed in Table I, their are four stable states with the remaining states being transient and used to track the progress of a multi-message transaction in which the directory receives a request message, forwards some sort of intermediate message, and waits for a response message before completing the transaction and returning the particular cache line to one of the four stable states.

TABLE I

| group | Name | Description |
| --- | --- | --- |
| Stable States | UNOWN | Line is not cached anywhere; only copy of the line is in memory. |
| | SHRD | Line is cached in a read-only state by one or more nodes. All cached copies of the line are identical to the one in memory. |

TABLE I-continued

| group | Name | Description |
|---|---|---|
| | EXCL | Line is cached in a read/write state by exactly one node. The cached copy of the line is more up to date than the copy in memory. |
| | SXRO | Line is cached in a read-only state by a single node in the system. This state is the result of a read exclusive read-only request. |
| Transient states for read to exclusive line | BUSY | sent intervention; rcvd nothing from new owner, nothing from old |
| | BSYEI | sent intervention; rcvd IWE from new owner, nothing from old |
| | BSYUW | sent intervention; rcvd WRBKI/WRBKR from new owner, nothing from old |
| | BSYUR | sent intervention; rcvd RQSH/RQSHR from new owner, nothing from old |
| | BSYEN | sent intervention; rcvd first half of response from old owner; do not write further data from old owner. Eventual state is EXCL. |
| | BSYEN | sent intervention; rcvd first half of response from old owner; allow writes of further data from old owner. Eventual state is EXCL. |
| | BSYSN | sent intervention; rcvd first half of response from old owner; do not write further data from old owner. Eventual state is SHRD. |
| | BSYSY | sent intervention; rcvd first half of response from old owner; allow writes of |
| | BSYUN | sent intervention; rcvd first half of response from old owner; do not write further data from old owner. Eventual state is UNOWN. |
| | BSYUY | sent intervention; rcvd first half of response from old owner; allow writes of further data from old owner. Eventual state is UNOWN. |
| Transient states after issuing a FLSH or ERASE | BSYF | Sent FLSH/ERASE, nothing received yet |
| | BSYFN | Waiting on second half of FLSH/ERASE result, data received |
| | BSYFY | Waiting on second half of FLSH/ERASE result, no data received |
| Transient states for GET to exclusive line | BUSYI | Tracking down an invalid copy for a GET |
| | BSYIW | Tracking down an invalid copy for a GET, have received a writeback from the owner. |
| Transient states for GET to exclusive line | BSYG | Sent ININF, nothing received yet |
| | BSYGN | Waiting on second half of ININF result, data received |
| | BSYGY | Waiting on second half of ININF result, no data received |
| Transient states for timed read-exclusive read-only requests | BSYX | Sent INEXC; nothing received yet. |
| | BSYXN | Sent INEXC and waiting for second half of result; data received |
| | BSYXY | Sent INEXC and waiting for second half of result; no data received |
| Transient states for non-timed read-exclusive read-only requests | BSYN | Sent INEXC; nothing received yet. |
| | BSYNN | Sent INEXC and waiting for second half of result; data received |
| | BSYNY | Sent INEXC and waiting for second half of result; no data received |
| Miscellaneous states | POIS | Line has been marked as inaccessible. Any attempt to read or write to the line will receive a PERK error response. This state can be entered only by a backdoor directory write by the OS. |

Information in the sharing vector tracks the location of exclusive or shared copies of a cache line as required to enforce the protocol that maintains coherence between those copies and the home location of the cache line. The sharing vector may be used in one of three ways depending on the directory state. The sharing vector may be in a pointer format as a binary node pointer to a single processor node or input/output node. This format is used when the state is EXCL as well as in most transient states. The sharing vector may be in a pointer timer format as a combination of an input/output read timer and a binary node pointer. This format handles the read exclusive read-only (RDXRO) transaction. The sharing vector may be in a bit vector format as a bit vector of sharers. The field is preferably partitioned into a plane bit vector, a row bit vector, and a column bit vector. This format is used when the cache line is in a SHRD state. Examples of the use of the sharing vector can be found in U.S. application Ser. No. 08/971,184 entitled "Multi-dimensional Cache Coherence Directory Structure", now U.S. Pat. No. 6,633,958, and in copending U.S. application Ser. No. 09/910,630 entitled "Method and System for Efficient Use of a Multi-dimensional Sharing Vector in a Computer System", both of which are incorporated herein by reference.

Each directory entry includes a priority field. Each incoming read request message also includes a priority field. When the incoming request message reaches the directory mechanism, its priority field is compared to the priority field in the associated directory entry. If the priority of the incoming request message is greater than or equal to that in the directory entry, the request message is allowed to be serviced normally. The result of servicing determines how the directory priority is updated. If the request message was serviced successfully, then the priority of the directory entry is reset to zero. If the request message was not serviced successfully, the priority of the directory entry is set to the priority of the request message. If the priority of the incoming request message is less than the priority of the directory entry, then the request message is not permitted to be serviced. A NACK is returned and the priority of the directory entry is not altered.

The protection-field in the directory entry is used to determine whether request messages for a cache line are allowed to be serviced. For protection purposes, all nodes in the system are classified as local or remote. Local/remote determination is made by using a source node number in the request message to index a local/remote vector stored in the memory directory. If the bit in the local/remote vector corresponding to the source node number is set, the access is classified as local. If the bit is cleared, the access is classified as remote. Once local/remote classification has been made, the protection bits in the protection field in the directory entry determine if the access is allowed. To implement the protection scheme, all request messages are classified as reads or writes. Any read request message to a cache line for which the requester does not have at least read-only permission will be returned as an access error reply and no directory state updates of any kind will occur. Any write request message for which the requester does not have read/write permission will be returned as a write error reply and no directory state updates of any kind will occur nor will the write data be written to memory. Table II shows an example of possibilities for local and remote access.

TABLE II

| Protection Value | Local Access Allowed | Remote Access Allowed |
|---|---|---|
| 00 | Read/Write | Nothing |
| 01 | Read/Write | Read-only |
| 10 | Read/Write | Read/Write |
| 11 | Read-only | Read-only |

The memory protocol is implemented cooperatively by the home memory directories and the various remote entities including the processors and associated processor interfaces, processor managed DMA mechanisms, and peer IO nodes.

The transient sharing state of coherence transactions at the remote locations is maintained in small associative memories, coherent request buffers (CRB). Entities that have globally coherent caches of system memory image also have internal state that is included in the implementation of the coherence related protocol. For these situations, a CRB tracks the transient state of interactions between it and the processor cache hierarchies across the front side bus.

The cached memory hierarchy implements a MESI protocol identifying four stable coherence states for each of the cache lines in the system. The processor coherence states are shown in Table III.

TABLE III

| IA-64 Cache Line State | Description | SN2 name | SN2 Mnemonic |
|---|---|---|---|
| Invalid | not present in this cache hierarchy | invalid | INV |
| Shared | read-only copy of line present in this cache hierarchy | shared | SHD |
| Exclusive | writable copy of line present in this cache hierarchy | clean exclusive | CEX |
| Modified | copy that is present is newer than the one in memory | dirty exclusive | DEX |

There are major categories of transactions that are tracked remotely. These include locally initiated read request messages, locally initiated write request messages, and incoming intervention requests. Interventions are received if the remote entity maintains a coherent locally cached image of global memory. In some cases, it may be convenient and efficient to manage separate CRBs for each category of request. Otherwise, a single CRB structure may be sufficient.

Information that is tracked in a remote CRB includes an address field, a state field, a type field, a counter field, a doomed field, a speculative reply field, and a NACK field. The address field includes the system address of the request message. The state field includes the current state of a transaction. If FREE, no transaction is being tracked with this directory entry. The type field specifies the type of request message. The counter field serves as a signed binary counter and is used to count invalidate acknowledgments. The doomed field tracks whether a cache line was invalidated while a read request message for it was outstanding. If the doomed field is set when the read response message returns, the read request message is retried. The speculative reply field tracks which part of a speculative reply message has been received. The NACK field counts how many times a request message has been NACK'd. This value is used to implement the fairness/starvation mechanism and may be used to detect a request message that has been excessively NACK'd.

Other information that may be tracked includes additional information to fully characterize the current transaction so that it can be correctly implemented locally as in on the local front side bus or IO interface with its own protocol requirements. Information may be tracked relating to local request messages or intervention request messages targeting the same address as a currently pending transaction. Optimizations and error handling information may also be indicated. Table IV summarizes information that may be tracked in a remote

TABLE IV

| category | Field | Description |
|---|---|---|
| | A | Address of the request |
| | S/V | transient state (FREE, BUSY, Etc.) |
| | T | Request type. |
| | C | Invalidate ack count (max value = max # of possible sharers in a system) |
| | D | Doomed. Set if a read request is invalidated before the read data returns. |
| | E | Speculative reply tracking. |
| | NC | NACK counter (in support of starvation avoidance) |
| conflicting local request pending | P | Pending request type. Indicates whether a second request has been issued to the same address and needs to be retried. |
| conflicting intervention | H | Held intervention type. |
| request pending | HS | Pointer to intervention source node. |
| | ECHO | Echo field from held intervention message. |
| auxiliary info | DID | Deferred ID tag, as when IA-64 request was first issued on the bus. |
| needed to complete the transaction locally | LEN | size of data payload |
| | SHD | Shared indication. Tracks whether another CPU on the bus had the line SHD or CEX. Determines whether read response can be placed in cache CEX or whether it must be placed in cache SHD. |
| optimizations, error handling, etc. | K | pending speculative read was satisfied locally before the response returned |
| | TO | time out counter to identify hung transactions |

Processor 16 can issue several classes of bus transactions. Table V summarizes the request phase transactions. Status presented in the snoop phase (not present, hit clean, or hit dirty) of a front side bus transaction is also processed as it indicates the lumped sharing state of the requested cache line for all cache hierarchies on that front side bus.

TABLE V

| group | Name | | Description | Source Proc | SHub |
|---|---|---|---|---|---|
| READ | BRLD | Bus Read Line Data | 126-byte cache line data fetch | ✓ | ✓ |
| | BRLC | Bus Read Line Code | 126-byte cache line fetch | ✓ | |
| | BRIL | Bus Read Line and Invalidate | Read request for an exclusive (i.e., writable) copy of a cache line | ✓ | ✓ |
| | BRP | Bus Read Partial | Read 1–16 bytes from a non-cached page. | ✓ | |
| | BRCL | Bus Read Current Line | probe for and acquire snap shot of dirty line without changing its state in owner's cache. | | ✓ |
| | BIL | Bus Invalidate Line | Invalidates a cache line in all caches on the bus. | | ✓ |
| WRITE | BWL | Bus Write Line | Write of 128 bytes of data. Issued by a processor when evicting a dirty line from its cache hierarchy or when spilling a full line from its WC (write coalescing) buffers | ✓ | |
| | BCR | Bus Cache Line Replacement | Used to indicate that a processor has dropped a clean-exclusive line. (also called relinquish: BRQSH) | ✓ | |
| | BWP | Bus write partial | Write of 1–64 bytes. Issued by a processor on a store to a non-cached page or when spilling a partially filled WC buffer. | ✓ | |

TABLE V-continued

| group | Name | | Description | Source | |
|---|---|---|---|---|---|
| | | | | Proc | SHub |
| MISC. | INT | Interrupt | Issues an interrupt to a specified processor. | ✓ | ✓ |
| | PTC | Purge TC | Requests a global translation cache (TLB) purge for a specified napping from all processors on this bus. | ✓ | ✓ |

Table VI shows examples of network request messages and Table VII shows network reply messages for the memory protocol. All network messages are classified as requests or replies. Each table specifies a message type, a mnemonic used to refer to the message type, a description of the message, a payload of the message whether it is a cache line or other payload, a supplemental field for the message, a source for the message, and a destination for the message. The supplemental field may include a priority value for managing fairness/starvation, a byte mask for non-coherent byte enabled writes, a payload length for non-coherent multi-word writes, a pointer to a target node for backoff operations, an invalidate acknowledgment count, a graphics credit return for flow control, and a sharing vector for invalidate operations. The source and destination are encoded as a directory at the home memory (D), a processor front side bus interface (P), a local IO or system support logic (L), and a peer node (X).

TABLE VI

| Group | | Name | Description | payload | | Suppl | Src | | | | Dest | | | |
|---|---|---|---|---|---|---|---|---|---|---|---|---|---|---|
| | | | | CL | Other | | D | P | L | X | D | P | L | X |
| READ | shared | READ | Read | | | Priority | ✓ | | | | ✓ | | | |
| | | RDSHD | Read shared | | | Priority | ✓ | | | | ✓ | | | |
| | exclusive | RDEXC | Read exclusive | | | Priority | ✓ | ✓ | ✓ | | ✓ | | | |
| | | RDXRO | Read exclusive read-only, timed | | | Priority | | ✓ | ✓ | | ✓ | | | |
| | | RDXRN | Read exclusive read-only, non-timed | | | Priority | | ✓ | ✓ | | ✓ | | | |
| | GET | GET | Read invalid | | | Priority | ✓ | | | | ✓ | | | |
| | | GETF | Read invalid, forced | | | Priority | ✓ | | | | ✓ | | | |
| | etc. | AMOR | Atomic memory operation, read | | | | ✓ | | | | ✓ | | | |
| | | NCRD | Non-coherent read | | | | ✓ | | | | ✓ | | | |
| WRITE | writeback | WRBK | Writeback | ✓ | | | ✓ | | | | ✓ | | | |
| | | WRBKR | Writeback, concurrent read outstanding | ✓ | | | ✓ | | | | ✓ | | | |
| | | IWE | Implicit writeback exclusive | ✓ | | | ✓ | | | | ✓ | | | |
| | | RQSH | CEX drop (relinquish) | | | | ✓ | | | | ✓ | | | |
| | | RQSHR | CEX drop, concurrent read outstanding | | | | ✓ | | | | ✓ | | | |
| | PUT | PUT | Write invalidate | ✓ | | Priority | | ✓ | ✓ | ✓ | | | | |
| | | PFCL | Cache line flush | | | Priority | ✓ | ✓ | ✓ | ✓ | | | | |
| | etc. | AMOW | Atomic memory operation, write | | ✓ | | ✓ | | | | ✓ | | | |
| | | NCWRD | Non-coherent write, doubleword | | ✓ | Mask | ✓ | | | | ✓ | | | |
| | | NCWRF | Non-coherent | ✓ | ✓ | Length | ✓ | | | | ✓ | | | |

TABLE VI-continued

| Group | | Name | Description | payload CL | Other | Suppl | Src D | P | L | X | Dest D | P | L | X |
|---|---|---|---|---|---|---|---|---|---|---|---|---|---|---|
| Probe | | INTER | write, cache line Intervention shared | ✓ | | | ✓ | ✓ | | | ✓ | | | |
| | exclusive | INEXC | Intervention exclusive | ✓ | | | ✓ | ✓ | | | ✓ | | | |
| | | FLSH | Flush | | | | ✓ | ✓ | | | ✓ | | | |
| | | ERASE | Eras | ✓ | | | ✓ | ✓ | | | ✓ | | | |
| GET | | ININV | Intervention invalid | ✓ | | | ✓ | ✓ | | | ✓ | | | |
| | | ININF | Intervention invalid, forced | ✓ | | | ✓ | ✓ | | | ✓ | | | |
| | etc. | INVAL | Invalidate | ✓ | | | ✓ | | ✓ | | ✓ | ✓ | ✓ | |
| INVAL generation | | BINEV | Backoff invalidate echo, vector format | | | Vector | ✓ | ✓ | ✓ | | ✓ | | | |
| | | LINVV | Local block invalidate vector | ✓ | | Vector | ✓ | | | | | ✓ | | |

TABLE VII

| Group | | Name | Description | Payload CL | other | Suppl | Src D | P | L | X | Dest D | P | L | X |
|---|---|---|---|---|---|---|---|---|---|---|---|---|---|---|
| READ | shared | SRPLY | Shared reply | ✓ | | | ✓ | | | | ✓ | | | |
| | | SRESP | Shared response | ✓ | | | | ✓ | | | ✓ | | | |
| | | SACK | Shared acknowledge | | | | | ✓ | | | ✓ | | | |
| | | BINTR | Backoff intervention shared | ✓ | | Target | ✓ | | | | ✓ | | | |
| | exclusive | ERPLY | Exclusive reply | ✓ | | Ack Cnt | ✓ | | | | ✓ | ✓ | ✓ | |
| | | ESPEC | Exclusive speculative reply | ✓ | | | ✓ | | | | ✓ | ✓ | ✓ | |
| | | ERESP | Exclusive response | ✓ | | | | ✓ | | | ✓ | ✓ | ✓ | |
| | | EACK | Exclusive acknowledge | | | | | ✓ | | | ✓ | ✓ | ✓ | |
| | | ERPYP | Exclusive reply, send PRGE | ✓ | | Ack Cnt | ✓ | | | | | | | ✓ |
| | | BIEXC | Backoff intervention exclusive | ✓ | | Target | ✓ | | | | ✓ | | | |
| | | BINW | Backoff invalidate, vector format | | | Vector | ✓ | | ✓ | | ✓ | ✓ | ✓ | |
| | | BINVP | Backoff invalidate, pointer format | | | Target | ✓ | | | | ✓ | ✓ | ✓ | |
| GET | | IRPLY | Invalid reply | ✓ | | | ✓ | | | | ✓ | ✓ | ✓ | |
| | | ISPEC | Invalid speculative reply | ✓ | | | ✓ | | | | ✓ | ✓ | ✓ | |
| | | IRESP | Invalid response | ✓ | | | | ✓ | | | ✓ | ✓ | ✓ | |
| | | IACK | Invalid acknowledge | | | | | ✓ | | | ✓ | ✓ | ✓ | |
| | | NACKG | Negative acknowledge to GET | | | | ✓ | | | | ✓ | ✓ | ✓ | |
| | | BIINV | Backoff intervention invalid | | | Target | ✓ | | | | ✓ | ✓ | ✓ | |

TABLE VII-continued

| Group | | Name | Description | Payload CL | Payload other | Suppl | Src D | Src P | Src L | Src X | Dest D | Dest P | Dest L | Dest X |
|---|---|---|---|---|---|---|---|---|---|---|---|---|---|---|
| | | BIINF | Backoff intervention invalid forced | ✓ | | Target | ✓ | | | | | ✓ | ✓ | ✓ |
| | etc. | ARRP | AMO read reply | | ✓ | | ✓ | | | | | ✓ | ✓ | ✓ |
| | | NCRP | Non-coherent read reply | ✓ | ✓ | | ✓ | | | | | ✓ | | ✓ |
| | | NACK | Coherent read negative acknowledge | | | | ✓ | | | | | ✓ | ✓ | ✓ |
| WRITE | writeback | WBACK | Writeback acknowledge | | | | ✓ | | | | | ✓ | ✓ | ✓ |
| | | WBBAK | Writeback busy acknowledge | | | | ✓ | | | | ✓ | | | |
| | PUT | WACK | Write invalidate acknowledge | | | Ack Cnt | ✓ | | | | | ✓ | ✓ | ✓ |
| | | WACKP | Write invalidate ack, send PRGE | | | Ack Cnt | ✓ | | | | | ✓ | ✓ | ✓ |
| | | WRACK | Write invalidate negative acknowledge | | | | ✓ | | | | | ✓ | ✓ | ✓ |
| | | BFLSH | Backoff flush | | | Target | ✓ | | | | ✓ | | | |
| | | BERSE | Backoff erase | | | Target | ✓ | | | | | ✓ | ✓ | ✓ |
| | etc. | AWAK | AMO write acknowledge | | | | ✓ | | | | | ✓ | ✓ | ✓ |
| | | NCWAK | Non-coherent write acknowledge | | | | ✓ | | | | | ✓ | | ✓ |
| PROBE | shared | SHWB | Sharing writeback | ✓ | | | ✓ | ✓ | | | ✓ | | | |
| | | DNGRD | Downgrade | | | | | ✓ | | | ✓ | | | |
| | | SHWBR | Sharing writeback, prior WB pending | ✓ | | | ✓ | ✓ | | | ✓ | | | |
| | | DNGDR | Downgrade with prior WB pending | | | | | ✓ | | | ✓ | | | |
| | exclusive | PRGE | Purge | | | | | ✓ | | | ✓ | | | |
| | | XFER | Ownership transfer | ✓ | | | ✓ | ✓ | | | ✓ | | | |
| | | PRGER | Purge with prior WB pending | | | | | ✓ | | | ✓ | | | |
| | | XFERR | Ownership transfer, prior WB pending | ✓ | | | ✓ | ✓ | | | ✓ | | | |
| | | IWACK | Implicit writeback race acknowledge | | | | | ✓ | | | ✓ | | | |
| | GET | IIACK | Intervention invalid ack | | | | | ✓ | | | ✓ | | | |
| | etc. | IVACK | Invalidate ack | | | | ✓ | ✓ | ✓ | | | ✓ | ✓ | ✓ |
| ERROR | | PERR | Poisoned access error | | | | | | | | | ✓ | ✓ | ✓ |
| | | AERR | Read protection violation error | | | | | | | | | ✓ | ✓ | ✓ |
| | | WERR | Write protection violation error | | | | | | | | | ✓ | ✓ | ✓ |
| | | DERRR | Directory error on a read request | | | | | | | | | ✓ | ✓ | ✓ |
| | | DERRW | Directory error on a write request | | | | | | | | | ✓ | ✓ | ✓ |

Incoming requests used by other nodes in system 10 to request data from memory include RDEXC, RDSHD, and READ which are used by processors to request coherent data in the exclusive, shared, or most convenient state, respectively; RDXRO and RDXRN used by IO nodes to request a read only copy without using the sharing vector;

GET and GETF which are used to request the current state of a cache line without keeping future coherence; NCRD which is used for a non-cached read of a double word; and AMOR which is used to request a special atomic memory read. Nodes return cache lines to memory by RQSH and RQSHR which are used to return an exclusive line to memory which has not been modified and the data itself is thus not returned; WRBK, WRBKR, and IWE which are used to return modified data to memory; PUT which is used by the IO system to overwrite all copies of a cache line without regard to its previous state; NCWRD and NCWRF which are used for non-cached writes of doublewords and cache lines; AMOW which is used to accomplish a special atomic memory write; and PCFL which is used to flush a cache line and force it out of all system caches.

Incoming replies are used to close out various transient states of the directory. They include XFER and XFERR which are used to return dirty data to memory when another node is getting a clean exclusive copy; SHWBR which is used to return dirty data to memory when the sending node and another node will be sharing the cache line; DNGRD and DNGDR which are used to notify the directory that the node now holds data shared rather than clean exclusive; PRGE and PRGER which are used to notify the directory that the node no longer holds the cache line at all; IIACK which is used to notify the directory that the current value of a cache line has been forwarded to a requestor who sent a GET; and IWACK which is used to close out a particularly complex case in the protocol involving implicit writebacks.

Outgoing requests are used if outgoing request credits are available. These include INTER and INEXC which are used to request that an intervention be used to send a copy of the cache line to the requester who wants it in a shared or exclusive state; ININV and ININF which are used to request that a Memory Read Current be done and the results passed to the requestor who no longer wants a coherent copy; INVAL which is used to request that a node drop a clean copy of a cache line; LINVV which is used to request that the Local Block send some number of invalidates based on a copy of the sharing vector from the directory entry; and FLSH and ERASE which are used to remove a cache line from a node with or without the return of any dirty data to the home memory. Outgoing backoff replies may be sent in place of outgoing requests if there is a potential for deadlock. These backoff replies are sent to the original requester who has space to store the needed action until it can be accomplished. Outgoing backoff replies are sent when there are no outgoing request credits available. They include BINTR, BIEXC, BIINV, BIINF, BINVP, BINVV, BFLSH, and BERSE.

Other outgoing replies involve returning data to a requester. These include SRPLY, ERPLY, ERPYP, and IRPLY which return usable data to the requester indicating different states; ESPEC and ISPEC which return speculative data to the requestor where there may or may not be a dirty copy in the system which needs to supersede the speculative data (with the requestor waiting to found out); NCRP which is used to return non-cached data; and ARRP which is used to return the results of an atomic read operation. Acknowledge writes include WBACK and WBBAK which are used to acknowledge writebacks and communicate whether the node needs to wait for a further message; WACK and WACKP which are used to acknowledge PUT and PFCL messages and indicate whether the sender needs to wait for INVAL or not; NCWAK which is used to acknowledge a non-cached write; and AWAK which is used to acknowledge an atomic memory write. Messages used to refuse acknowledgment of a request where the requestor must take appropriate action include NACK, NACKG, and WNACK. Error conditions are indicated by AERR, DERRR, DERRW, WERR, and PERR.

Table VIII and IX show the request and reply messages for the Programmed input/output protocol. PIO reads and writes of both a single doubleword and a full cache line are supported.

TABLE VIII

| group | | Name | Descriptions | Payload | | |
|---|---|---|---|---|---|---|
| | | | | CL | Other | Suppl |
| Initial Requests | read | PRDI | PIO dword read | | | Mask |
| | | PCRDI | PIO cache line read | | | |
| | write | PWRI | PIO dword write | | ✓ | Mask |
| | | PCWRI | PIO cache line write | ✓ | | |
| Retry Requests (Retry requests have two flavors (A and B) which are used to guarantee forward progress) | read | PRIHA/B | PIO dword read retry, head A/B | | | Mask |
| | | PRIRA/B | PIO dword read retry, non-head A/B | | | Mask |
| | | PCRHA/B | PIO cache read retry, head A/B | | | |
| | | PCRRA/B | PIO cache read retry, non-head A/B | | | |
| | write | PWIHA/B | PIO dword write retry, head A/B | | | Mask |
| | | PWIRA/B | PIO dword write retry, non-head A/B | | | Mask |
| | | PCWHA/B | PIO cache write retry, head A/B | | | |
| | | PCWIA/B | PIO cache write retry, non-head A/B | | | |

TABLE IX

| group | Name | Description | Payload | | |
|---|---|---|---|---|---|
| | | | CL | Other | Suppl |
| ACK responses | PRPLY | PIO dword read reply | | ✓ | |
| | PCRPY | PIO cache line read reply | ✓ | | |
| | PACKN | PIO dword write ack, normal mode | | | |
| | PACKH | PIO dword write ack, head mode | | | |
| | PCAKN | PIO cache line write ack, normal mode | | | |
| | PCAKH | PIO cache line write ack, head mode | | | |
| NACK responses | PNKRA/B | PIO dword read NACK, queue A/B | | | |
| | PCNRA/B | PIO cache line read NACK, queue A/B | | | |
| | PNKWA/B | PIO dword write NACK, queue A/B | | | |
| | PCNWA/B | PIO cache line write NACK, queue A/B | | | |
| Error responses | PCNWA | PIO read error | | | |
| | PWERR | PIO write error | | | |
| | PSDBK | PIO TLB shootdown deadlock break | | | |

Table X shows the request and reply messages for the graphics flow control protocol. This protocol provides the means by which uncached writes to a graphics region of the physical address space are transferred to a graphics device. A graphics write is received from the front side-bus and, forwarded to the proper destination. As the graphics device consumes data, credits are returned to the originating node to permit, additional graphics writes to be sent.

TABLE X

| Name | Description | Payload | Suppl |
|---|---|---|---|
| GFXW1 | Graphics dword write | DW | |
| GFXWC | Graphics cache line write | CL | |
| GFXCR | Graphics credit | | Credits |
| GFXER | Graphics write error | | |

TABLE XI shows the request and reply messages for the administrative protocol. The administrative protocol supports several types of messages that act on the router itself rather than simply being passed through the router. These messages include vector operations to read and route internal router state and additional messages used in implementing the hardware-barrier tree mechanism. Other messages facilitate interrupt and TLB shootdown distribution.

TABLE XI

| Name | Description | Payload | Suppl |
|---|---|---|---|
| VRD | explicitly routed (vector) read | ✓ | |
| VWR | Vector write | ✓ | |
| BAR | Vector barrier | ✓ | |
| LINTR | Local interrupt (Normally never appears on the network but error interrupts on headless nodes are directed off-node) | ✓ | |
| LPTC | Local TLB shootdown | ✓ | |
| VRPLY | Vector read reply | ✓ | |
| VWACK | Vector write ack | ✓ | |
| VERRA | Vector address error | ✓ | |
| VERRC | Vector command error | ✓ | |
| VERAC | Vector address/command error | ✓ | |

Despite the many message types and transient states to track and resolve, the protocol scheme follows a basic function to handle initial request messages. In general, processors and input/output agents issue coherent read and write request messages to memory. How a particular read and write request message is processed is determined by the directory state when the initial request message reaches the directory. The memory will service each individual request message according to one of several generalized procedures. Memory may respond to a request message through a direct reply wherein a read data or write acknowledge reply is sent to the message requestor if the cache line is in a standby state or by NACKing the request message if the cache line is in a transient state. The memory may also return a preliminary reply and issue an intervention request, an invalidate request, or a backoff response. The intervention request is sent to the current owner of the cache line. The invalidate request is sent to the current owner of the cache line and shares thereof. The backoff response is sent to the requestor in order to have, the requestor issue the intervention or invalidate requests on its own. The subsequent messages issued by the memory will eventually produce another reply message which is forwarded to the requester advising of the final disposition of the request message.

Coherent read request messages include a shared read that obtains a read-only copy of a cache line for which other read-only copies may exist elsewhere in the system. The read-only copy is persistent in that the memory system tracks all sharers so that it may invalidate their copies if the cache line is subsequently modified. An exclusive read is a read and writable copy of a cache line for which no other copy is allowed to exist except for the one in main resident memory. Memory will retrieve the cache line from an exclusive owner if some other entity desires a coherent copy of it. A get read obtains a momentarily coherent read-only copy of a cache line. The memory system does not include the requester in the sharer tracking process and essentially forgets about the copy obtained in this manner.

Coherent write request messages may be a writeback of exclusively held cache resident cache lines to memory. An explicit writeback occurs-when a dirty exclusive (DEX) line in a processor cache is evicted to make room for a new cache line from another memory address. A relinquish writeback is similar to an explicit writeback except that the cache line is still clean (CEX) so no data is actually returned to memory. An implicit writeback occurs as a result of a probe to a dirty cache line on the owner's front side bus either by another processor on that front side bus or as part of an intervention issued on behalf of the memory system. A coherent write request message may also be a put write message that writes full cache lines of data directly to memory rather than by obtaining an exclusive copy of a cache line and modifying it remotely before returning it to memory. As a result, all remote copies of a targeted cache line are invalidated.

Request messages that query the processor cache hierarchy on a front side bus are called probes. A probe may include an invalidate request or an intervention request. An invalidate request will expunge shared copies of a cache line if it is still present in one or more of the caches on the front side bus. An intervention request will retrieve the up to date value of an exclusively held and possibly modified cache line in one of the caches on the target front side bus. A probe ultimately results in one or more additional reply messages sent back to the original requestor and a separate reply message sent back to the directory. If memory cannot safely issue a probe without risking a chance of deadlock, it will issue a backoff response message to the requester instead of directly sending the probe. The backoff response message tells the requester to initiate the probe on its own. Subsequent protocol procedures at the directory and elsewhere are essentially unchanged regardless of who issues the probe.

Table XII shows examples of coherent request messages that a directory may receive and the initial and secondary actions that may be taken in response to the request messages. Backoff responses and secondary transient states are not shown. Replies from the directory target the requestor and probes target the current owner or sharers of record. Probe responses are generally returned to the directory by the current owner. Invalidate probes do not produce probe responses to the directory except for a write invalidate message (PUT or PFCL) and read exclusive read-only request messages (RDXRN or RDXRO). In these cases, the probe response is a PRGE from the original requester rather than from the current owner.

TABLE XII

| Request Type | Current Line State | Actions | | | | | Primary Probe Response | Final Line State |
|---|---|---|---|---|---|---|---|---|
| | | Reply | | Probe Request | Vector Action | Transient State | | |
| | | Type | AckCnt | | | | | |
| READ | UNOWN | ERPLY | 0 | | pointer | | | EXCL |
| | SHRD | SPRLY | | | add | | | SHRD |
| | EXCL | ESPEC | | INTER | pointer | BUSY | DNGRD SHWB | SHRD |
| | | | | | | | PRGE XFER | EXCL |
| | SXRO | | | | | | | |
| | SXRO (Exp) | | | | | | | |
| | all others | | | | | | | |
| RDSHD (same as READ except SXRO?) | UNOWN | SRPLY | | | new | | | SHRD |
| | SHRD | SRPLY | | | add | | | SHRD |
| | EXCL | ESPEC | | INTER | pointer | BUSY | DNGRD SHWB | SHRD |
| | | | | | | | PRGE XFER | EXCL |
| | SXRO | ERPLY | 1 | INVAL | new | | | SHRD |
| | SXRO (Exp) | SRPLY | | | pointer | | | SHRD |
| | all others | NACK | | | | | | n/c |
| RDEXC | UNOWN | ERPLY | 0 | | pointer | | | EXCL |
| | SHRD | EPRLY | # shares | INVAL(s) | pointer | | | |
| | EXCL | ESPEC | | INEXC | pointer | BUSY | PRGE XFER | |
| | SXRO | ERPLY | 1 | INVAL | pointer | | | |
| | SXRO (Exp) | ERPLY | 0 | | | | | |
| | all others | NACK | | | | | | n/c |
| RDXRO | UNOWN | ERPLY | 0 | | new | | | SXRO |
| | SHRD | ERPLY | # shares | INVAL(s) | pointer | BSYX | PRGE | |
| | EXCL | ESPEC | | INEXC | pointer | | XFER | |
| | | | | | | | PRGE | |
| | SXRO | ERPLY | 1 | INVAL | pointer | | PRGE | |
| | SXRO (Exp) | ERPLY | 0 | | pointer | | | |
| | all others | NACK | | | | | | n/c |
| RDXRN | UNOWN | ERPLY | 0 | | | | | SXRO |
| | SHRD | EPRLY | # shares | INVAL(s) | pointer | BSYN | PRGE | |
| | EXCL | ESPEC | | INEXC | pointer | | XFER PRGE | |
| | SXRO | ERPLY | 1 | INVAL | pointer | | PRGE | |
| | SXRO (Exp) | ERPLY | 0 | | pointer | | | |
| | all others | NACK | | | | | | n/c |
| GET | UNOWN | IRPLY | | | n/c | | | UNOWN |
| | SHRD | IRPLY | | | n/c | | | SHRD |
| | EXCL | none | | ININV | n/c | BUSYI | IIACK | EXCL |
| | SXRO | IRPLY | | | n/c | | | SXRO |
| | SXRO (Exp) | IRPLY | | | n/c | | | SXRO (Exp) |
| | all others | NACK | | | n/c | | | all others |

TABLE XII-continued

| | | | | | | | | |
|---|---|---|---|---|---|---|---|---|
| GETF (same as GET except EXCL case) | UNOWN | IRPLY | | | | | | UNOWN |
| | SHRD | IPRLY | | | n/c | | | SHRD |
| | EXCL | ISPEC | | ININF | new? | BSYG | DNGRD | SHRD |
| | | | | | n/c | | PRGE | UNOWN |
| | | | | | n/c | | XFER | UNOWN |
| | SXRO | IRPLY | | | n/c | | | SXRO |
| | SXRO (Exp) | IRPLY | | | n/c | | | SXRO (Exp) |
| | all others | NACK | | | n/c | | | n/c |
| PUT | UNOWN | WACK | 0 | | | | | UNOWN |
| | SHRD | WACKP | # shares | INVAL (s) | | BSYF | PRGE | |
| | EXCL | none | | ERASE | | | | |
| | SXRO | WACKP | 1 | INVAL | | | | |
| | SXRO (Exp) | WACK | | | | | | |
| | all others | WNACK | | | | | | n/c |
| PFCL (same as PUT except EXCL case) | UNOWN | WACK | 0 | | | | | UNOWN |
| | SHRD | WACKP | # shares | INVAL (s) | | BSYF | PRGE | |
| | EXCL | none | | FLSH | | | XFER | |
| | SXRO | WACKP | 1 | INVAL | | | PRGE | |
| | SXRO (Exp) | WACK | | | | | | |
| | all others | WNACK | | | | | | n/c |
| WRBK | EXCL' | WBACK | | | | | | UNOWN |
| WRBKR | | | | | | | | |
| RQSH | | | | | | | | |
| RQSHR | | | | | | | | |
| IWE | | | | | | | | EXCL |

Writebacks (WRBK, WRBKR, RQSH, RQSHR, and IWE) should never hit a line in SHRD, SXRO or UNOWN. Writebacks to any transient state line (BUSY, etc.) represent protocol races. These are not nacked as all other requests would be because the information needed to fully process the request is implicit in the request itself. However, the proceeding also depends on current and pending ownership and the specific type of transient state encourntered. In general, the Reply to a Writeback request in this case is either a normal WBACK or a WBBAK (Writeback Busy Acknowledge).

Processor 16 defines a slightly different set of state transitions in response to interventions than was used in other processors such as the R10000. Table XIII shows the state transitions: for processor 16 as compared to other processors such as the R10000. The main difference is in the handling of a shared intervention (BRL) that targets a cache line in a dirty exclusive (M) state. The M to I transition on a BRL differs from traditional handling of shared interventions. This difference, though seemingly minor, has a significant impact on the directory state transitions that occur in the course of handling an intervention. The complication occurs in that the directory does not know the ultimate state of the cache line in the old owner's cache until the intervention is issued and the snoop result observed. Further complicating matters is the possibility that a writeback (WRBK), relinquish (RQSH), or implicit writeback (IWE) will be outstanding when the intervention arrives.

TABLE XIII

| Intervention Type | Current Cache State | New Cache State, Other Processors | New Cache State, Processor 16 |
|---|---|---|---|
| Shared (BRL) | DEX (M) | SHD (S) | INV (I) |
| | CEX (E) | SHD (S) | SHD (S) |
| | SHD (S) | SHD (S) | SHD (S) |
| | INV (I) | INV (I) | INV (I) |
| Exclusive (BRIL,) | DEX (M) | INV (I) | INV (I) |
| | CEX (E) | INV (I) | INV (I) |
| | SHD (S) | INV (I) | INV (I) |
| | INV (I) | INV (I) | INV (I) |

The following is an example of intervention handling. When there is no write request message outstanding (no WRBK, RQSH, or IWE), an IRB, entry in processor interface 24 is allocated and an intervention is issued on the front side bus. A BRL is issued for INTER and ININF probes. A BRIL is issued for INEXC and FLSH probes. A BIL is issued for an ERASE probe. A BRCL is issued for an ININV probe. Once the intervention has issued, the IRB awaits the snoop result to determine the state of the cache line in the processor cache. Processing of the intervention varies according to the snoop result. If the cache line was in the M state (HITM asserted in the snoop phase), the old owner will not retain the cache line at all. The requester takes the cache line as clean exclusive (CEX). The final directory state becomes EXCL with the requester as the owner. The old owner sends an ownership transfer (XPER) message to the directory and, if the intervention was not a FLSH or ERASE, sends an ERESP message to the requestor. An IRESP message is sent if the intervention was an ININF. If the cache line was in the E or S states (HIT asserted in the snoop phase), the old owner will retain a shared copy of the cache line. The requestor takes the cache line as shared (SHD). The final directory state of the cache line will be SHRD with both the old owner and requester as sharers. The old owner will send a downgrade (DNGRD) message to the directory and, if the intervention was not a FLSH or ERASE, sends an SACK message to the requester. An IACK message is sent if the intervention was an ININF. If the cache line was in the I state (neither HIT nor HITM asserted in the snoop phase), the old owner will not retain the cache line at all and the requestor takes the cache line EXCL as in the M state case above. This case occurs when the old owner originally obtained the cache line CEX and dropped it without issuing a relinquish request message. The old owner will send a purge (PRGE) message to the directory and, if the intervention was not a FLSH or ERASE, sends an EACK message to the requester. An IACK message is sent if the intervention was ININF.

Different processing is needed to handle an intervention that arrives when a write request message is outstanding. Processing of the intervention on what types of write request messages are outstanding. There may be more than one type outstanding as the WRB entry in processor interface 24 can hold two write requests, one that has been sent into the network (the WRB T field) and a second that is pending (the WRB P field). Table XIV shows the intervention processing possibilities when a write request message is outstanding. The first line of Table XIV shows the case discussed above with no write request message outstanding. If there is a writeback or relinquish outstanding, no intervention needs to be issued because the presence of the writeback or relinquish indicates that the processor no longer holds the cache line. In the WRBK and WRBKR cases, the data is forwarded from the WRB data buffer to the requester as part of the ERESP message. In the RQSH and RQSHR cases, no data is available and thus only an EACK message needs to be sent. The WRB P field is none in these cases as the processor does not generate further write requests once it has issued a writeback or relinquish message.

TABLE XIV

| WRB T Field | WRB P Field | Issue Intervention on FSB? | Message to Directory | Message to Requester |
|---|---|---|---|---|
| none | none | Yes | (Per Simple Intervention) | (Per Simple Intervention) |
| BWL | none | No | none | ERESP |
| BWLR | none | No | PRGER | ERESP |
| BRQSH | none | No | none | EACK |
| BRQHR | none | No | PRGER | EACK |
| BIWE | none | Yes | (See discussion below) | (See discussion below) |
|  | BIWE | Yes | (See discussion below) | (See discussion below) |
|  | BRQSH | No | PRGER | ERESP |
|  | BRQHR | No | PRGER | ERESP |
|  | BWL | No | XFERR | ERESP |
|  | BWLR | No | XFERR | ERESP |

The "I" versions of the messages are sent if the intervention was an ININF. That is, an IRESP instead of an ERESP and an IACK instead of an EACK. Also, the WRBKR case has further complications that result from a possible race between a WRBKR and a PUT message. These complications require that the message to the requester be delayed until the old owner receives either a WBACK or WBBAK. Depending on whether a WBACK or WBBAK is received, the old owner sends either an ERESP or an EACK to the requester.

Complications occur when there is an implicit writeback (IWE) outstanding in the network. The IWE data in the WRB data buffer may or may not be the most up to date copy of the cache line. If the WRB P field indicates a writeback or relinquish message, then the WRB data is up to date and forwarded to the requestor in an ERESP message. If no write request is pending or if there is a second IWE pending, the intervention is issued on the front side bus to determine whether the processor has modified the cache line since issuing the initial IWE. If the snoop result is HITM, the data from the front side bus is forwarded to the requester and the directory in the same manner as the M state discussed above. If the snoop result is HIT or neither HIT nor HITM, then the data in the WRB data buffer is current and forwarded to the requester as either an ERESP or SRESP message depending on the intervention type. The data is sent to the directory as either a SHWB or XFER depending on the intervention type. The WRB data is not forwarded to the directory if the WRB P field is NONE since the IWE already outstanding in the network contains the up to date copy of the cache line. In this case, a PRGER message is sent instead.

Implicit writebacks (IWE) are generated when a processor issues a BRL or BRIL and the HITM signal is asserted in the snoop phase indicating that another processor on the bus holds the cache line in a DEX state and will supply the data to the requesting processor. Since the processor asserting HITM is relinquishing ownership of a modified cache line and the requesting processor is not guaranteed to place the cache line in its cache in a DEX state, the cache line could be dropped from all processors on the bus and its contents lost upon a cache to cache transfer. Thus, at the same time the processor asserting HITM is transferring the cache line to the requesting processor, the cache line is read and written back to memory. This writing back to memory in this instance is an implicit writeback. Three implicit writeback cases are discussed below.

When a requesting processor issues a BRL, the cache line is loaded into the requesting processor's cache in the CEX state and dropped from the owning processor's cache. An implicit writeback message is generated in this instance. The IWE message includes the latest copy of the cache line and indicates that the cache line is being retained in the CEX state by the originator of the IWE message. Since the cache line is now in the CEX state, the new owning processor can write to the cache line and update its state to DEX at any time. If such a write occurs and the state becomes DEX and another processor on the bus issues a BRL, the implicit writeback case will once again arise. This situation may repeat indefinitely, thereby generating an unbounded number of implicit writebacks.

When a requesting processor issues a BRIL with OWN# not asserted, the cache line is loaded in the CEX state into the requesting processor and is dropped from the cache of the owning processor similar to the BRL case above. When a requesting processor issues a BRIL with OWN# asserted, the requesting processor indicates that it will place the line in its cache in the DEX state rather than the CEX state. An implicit writeback is not required as the requesting processor cannot drop the cache line without first issuing a normal writeback.

Ordinarily, the most up to date copy of a cache line is in one of two places—the cache of the owning processor or main memory. Obtaining the latest copy of a cache line is simply performed by sending an intervention to the owner. If the intervention retrieves the cache line with state DEX, then the cache line is the latest copy. If the state of the cache line is not DEX, the cache line was dropped or is being written back and the directory will receive the latest copy when the writeback arrives. As a cache line can be written back once, by definition the latest copy of the cache line is received when the writeback arrives. However, implicit writebacks considerably complicate finding the latest copy of a cache line. The problem lies in that the implicit writeback may or may not have the latest copy of the cache line. Only by issuing an intervention can the latest copy of the cache line be discovered. If the intervention finds the cache line in a DEX state, then that is the latest copy. If the cache line has been dropped, then the implicit writeback has the most up to date copy of the cache line. However, the processor can issue multiple implicit writebacks. If the cache line is not in the processor's cache, the protocol scheme needs to ensure that data is retrieved from the most recently issued implicit writeback which may or may not be the one that is in flight in the network or has just been received at the directory.

Figure 3:
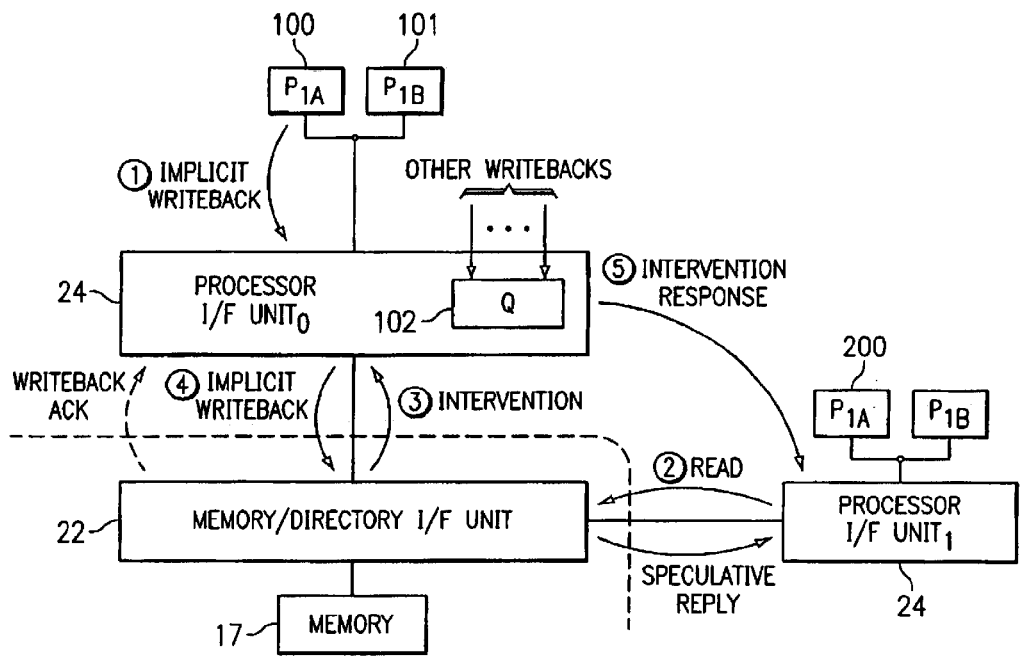
FIG. 3 illustrates a block diagram of the distributed shared memory computer system handling numerous writebacks initiated by a processor.

FIG. 3 shows an example to alleviate the problem of multiple implicit writebacks flowing through system 10. In FIG. 3, a processor 100 has obtained a copy of a cache line and sends an implicit writeback. The implicit writeback is processed by the front side bus processor interface 24 and sent to the appropriate memory directory interface unit 22 associated with the memory 17 which is the home for the cache line. Upon processing the implicit writeback, memory directory interface unit 22 returns a writeback ACK. Front side bus processor interface 24 receives the writeback ACK to indicate that memory 17 has the same copy of the cache line as processor 100. If changes to the cache line are made by processor 100, it will initiate another writeback, either a normal writeback or an implicit writeback, for each change made to the cache line. Also, ownership of the cache line may pass back and forth between co-located processors 101 in a node, each initiating an implicit or normal writebacks. Instead of processing each and every writeback initiated by processor 100, front side bus processor interface 24 will maintain the, most recent writeback request in a queue 102. For each implicit or normal writeback request received at its queue, front side bus processor interface 24 will discard the previous writeback request. Once front side bus processor interface 24 receives the writeback ACK from memory directory interface unit 22 for the initial implicit writeback, the current writeback request if any in the queue is transferred to memory directory interface unit 22 for processing and the process repeats. If the current writeback request in the queue is an implicit writeback, then the process is repeated. If the current writeback request in the queue is a normal writeback, then any subsequent writebacks are processed in the order they are received. Once an implicit writeback is reached, the above process may be repeated.

FIG. 3 also shows the events that occur when a remote processor seeks access to the cache line prior to processing of the implicit writeback. After processor 100 initiates an implicit: writeback, to front side bus processor interface 24, a remote processor 200 initiates a read request to memory directory interface unit 22. Memory directory interface unit 22 initiates an intervention for transfer to front side bus processor interface 24 since it thinks that processor 100 is the current owner of the cache line. Memory directory interface unit 22 will also send a speculative response to remote processor 200 since it thinks it has the latest copy of the cache line. Front side bus processor interface 24 receives the intervention but knows it has an implicit writeback to process. The intervention is placed on hold and the implicit writeback is sent to memory directory interface unit 22. Upon processing the implicit writeback, memory directory interface unit 22 sends the writeback ACK. Front side bus processor interface 22 receives the writeback ACK and determines if there is a pending writeback in its queue 102. If so, front side bus processor interface 24 sends out the pending writeback to memory directory interface unit 24 and also sends out a response to remote processor 200 since it has the latest copy of the cache line. In this manner, the latest copy of the cache line may be provided for read requests while a writeback is pending.

Figure 4:
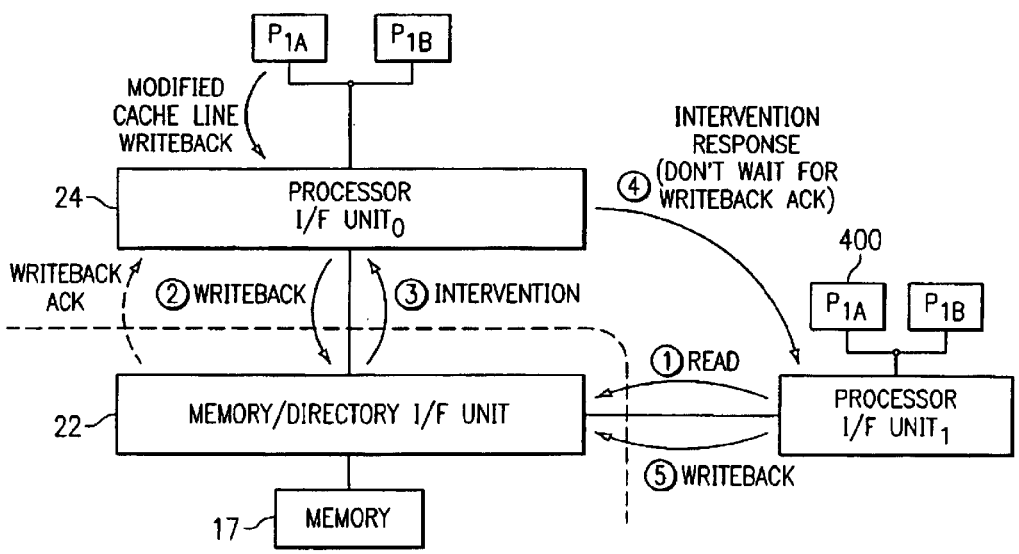
FIG. 4 illustrates a block diagram of distributed shared memory computer system handling a transfer of cache line ownership.

FIG. 4 shows an example of the transfer of ownership of a cache line during a pending writeback. A cache coherence protocol that is based upon supporting nodes with snoopy processor buses that generate implicit writeback operations can cause delay in the transition of ownership to a node/processor if another node/processor already has exclusive ownership and is in the process of writing modified data back to memory. The transfer of ownership provided in FIG. 4 does not rely on the completion of a write to memory from the former owner of a cache line before allowing a new owner to gain exclusive ownership of that cache line. A processor 300 has a modified cache line and initiates either a normal or implicit writeback to front side bus processor interface 24. Prior to transfer of the writeback to memory directory interface unit 22, a remote processor 400 initiates a read request. Memory directory interface unit 22 generates an intervention message in response to the read request and receives the writeback from front side bus processor interface 24. Front side bus processor interface 24 receives the intervention message and, before receiving a writeback ACK from memory directory interface unit 22, sends a response to the intervention message to remote processor 400 that includes the cache line requested by remote processor 400. Remote processor 400 now has ownership of the cache line and can modify it or drop it as desired. If remote processor 400 drops the cache line, the cache line is not lost as the writeback from processor 300 is still pending to preserve the cache line in memory. If remote processor 400 modifies the cache line, a writeback is sent to memory directory interface unit 22 from remote processor 400. If the initial writeback is received at memory directory interface unit 22 first, then it will be processed followed by the writeback from remote processor 400 in a normal manner. If the writeback from remote processor 400 is received first, then memory directory interface unit 22 processes it and updates the cache line data in memory. Upon receiving the writeback from processor 300, memory directory interface 22 will not update the cache line data for this writeback.

In some circumstances, a processor may obtain ownership of a cache line and not make any changes to the cache line. The processor may just drop the cache line if it no longer needs it. If the processor drops the cache line, the rest of the system does not become aware of the dropping of the cache line and interventions for the cache line will continue to be sent to the processor. To avoid processing of interventions in this scenario, the processor is programmed to send out a relinquish message to let the system know that it is giving up ownership of the cache line. Thus, only those interventions need be processed that were initiated prior to processing of the relinquish message at memory directory interface unit 22. A relinquish message is processed as a data less writeback since it is not modifying the cache line in memory as the memory has the current copy of the cache line due to no changes being made to the cache line at the processor. Once the relinquish command has been processed, memory directory interface unit 22 can directly handle a read request without initiating an intervention to the processor that gave up ownership of the cache line.

Figure 5:
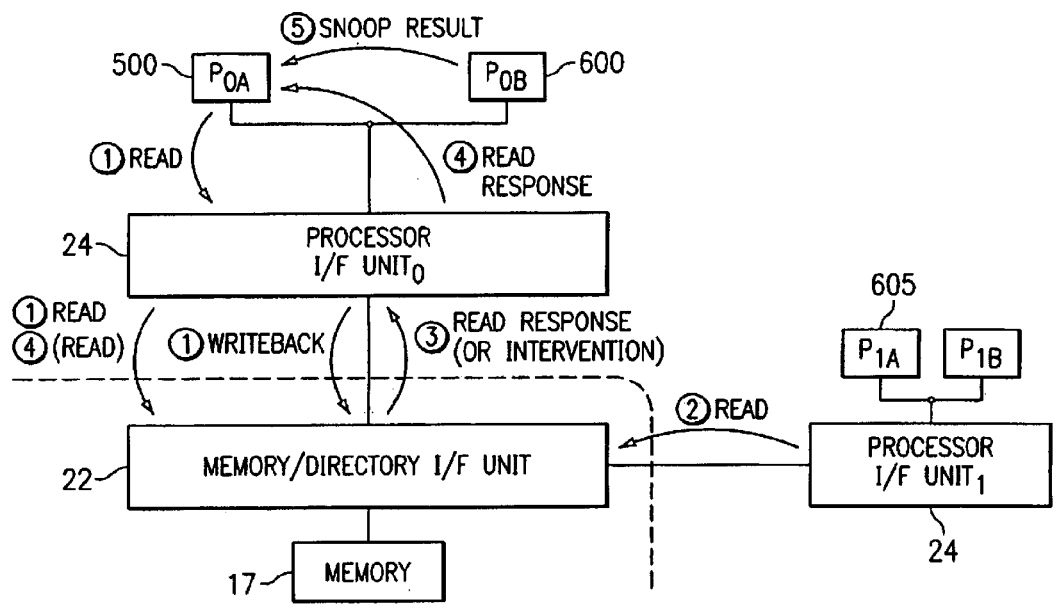
FIG. 5 illustrates a block diagram of distributed shared memory computer system handling concurrent snoop and read operations.

FIG. 5 shows how memory latency can be reduced during read requests. System 10 is a distributed shared memory system with nodes based on snoopy processor buses. When processor 500 makes a read request, a snoop operation is performed at a colocated processor 600 on the local bus. Before the snoop operation is completed, the read request is forwarded from front side bus processor interface 24 to a local or remote memory directory interface unit 22 for processing. If the snoop operation determines that the cache line needed is held in colocated processor 600 by indicating a processor hit and the data being modified, the data is provided to processor 500 by colocated processor 600 over the local bus for its use. Memory directory, interface unit 22 processes the read request and forwards a response to front side bus processor interface 24. Front side bus processor interface 24 sees that the snoop operation satisfied the read request and subsequently discards or ignores the response from memory directory interface unit 22.

If the snoop operation determines that the cache line is not available locally, then the cache line is obtained by processor 500 through normal processing of the read request. Memory directory interface unit 22 obtains the cache line from memory or fetches the cache line from a remote processor 605 if it has a modified version of the cache line. If processor 500 obtains the data from processor 600, processor 500 may place a writeback request to update the home memory for the data. The writeback request includes an indication that there is an outstanding read request in the system. In case the writeback request is received at memory interface an outstanding read request in the system. In case the writeback request is received at memory interface unit 22 prior to the read request, the writeback request provides the necessary indication to memory directory interface unit that the read request is not to be processed.

Figure 6:
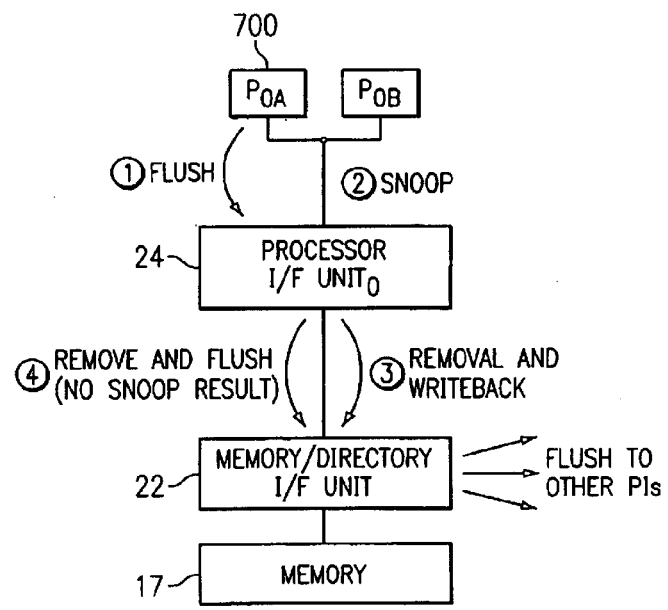
FIG. 6 illustrates a block diagram of the distributed shared memory system performing a cache flush operation.

FIG. 6 shows how cache flushes can be performed in system 10. Conventionally, a request to flush a cache in a local bus system provides a mechanism to have the memory maintain the only copy of a cache line with no processor maintaining a copy of the cache line. The local bus system is not aware of the other processors on other local buses having a copy of the flushed cache line in an implementation such as system 10. The technique of FIG. 6 extends the local bus system flush capability to the distributed shared memory multiprocessor computer system of system 10. A processor 600 initiates a flush request for a particular cache line. Processor interface 24 receives the flush request and performs a snoop operation to determine whether the cache line is maintained in any local processor and then whether the cache line has been modified. If the snoop result is that the cache line is maintained locally and has been modified, processor interface 22 initiates removal of the cache line from the cache of the identified processor. The identified processor initiates a writeback for transfer to memory directory interface unit 22 associated with the home memory 17 for the data in order to preserve its modifications.

If the snoop result is that the cache line is not maintained locally or the cache line has not been modified, processor interface 24 forwards the flush request to memory directory interface unit 22 associated with home memory 17 of the cache line. The local processors having an unmodified copy of the cache line may be flushed of the cache line at this point. Memory directory interface unit 22 determines which processors in system 10 maintain a copy of the cache line. The flush request is then forwarded to the identified processors for appropriate action. If an identified processor has a modified copy of the cache line, it removes the modified copy from its cache and forwards the modified copy in a writeback request to memory directory interface unit 22 for memory 17 update.

Thus, it is apparent that there has been provided, in accordance with the present invention, a system and method for handling updates to memory in a distributed shared memory system that satisfy the advantages set forth above. Although the present invention has been described in detail it should be understood that various changes, substitutions, and alterations may be made herein. For example, though shown as individual protocols schemes, different combinations of message processing may be performed according to the protocol scheme. Other examples may be readily ascertainable by those skilled in the art and may be made herein without departing from the spirit and scope of the present invention as defined by the following claims.

What is claimed is:

1. A method for handling updates to memory in a distributed shared memory system, comprising:
  receiving ownership of data at a first processor;
  initiating an initial update to memory request for the data from the first processor;
  forwarding the initial update to memory request to a memory directory associated with a home memory for the data;
  initiating subsequent updates to memory requests for the data;
  maintaining a most recent subsequent update to memory request;
  receiving an update acknowledgment corresponding to the initial update to memory request indicating that the data has been updated in its home memory;
  forwarding the most recent subsequent update to memory request to the memory directory for processing in response to the update acknowledgment.

2. The method of claim 1, further comprising:
  discarding all but the most recent update to memory request.

3. The method of claim 1, wherein the initial update to memory request is an implicit writeback.

4. The method of claim 1, wherein the most recent subsequent update to memory is an implicit writeback.

5. The method of claim 4, further comprising:
  initiating new updates to memory requests for the data;
  maintaining a most recent new update to memory request;
  receiving an update acknowledgment corresponding to the most recent subsequent update to memory request indicating that the data has been updated in its home memory;
  forwarding the most recent new update to memory request to the memory directory for processing in response to the update acknowledgment.

6. The method of claim 1, wherein the most recent subsequent update to memory is a normal writeback.

7. The method of claim 6, further comprising:
  initiating new updates to memory requests for the data;
  receiving an update acknowledgment corresponding to the most recent subsequent update to memory request indicating that the data has been updated in its home memory;

forwarding the new updates to memory request to the memory directory in order for processing in response to the update acknowledgment.

8. The method of claim 1, further comprising:

receiving a read request for the data at the memory directory from a second processor prior to receiving the initial update to memory request;

transferring an intervention request from the memory directory towards the first processor to obtain the data for the second processor;

providing the data to the second processor from the first processor prior to processing the initial update to memory request.

9. The method of claim 8, further comprising:

providing a speculative copy of the data from the memory directory to the second processor.

10. The method of claim 8, wherein the second processor obtains ownership of the data.

11. A system for handling updates to memory in a distributed shared memory system, comprising:

a plurality of processors on a local bus, a first one of the plurality of processors operable to obtain ownership of data, the first one of the plurality of processors operable to send an initial update to memory request for the data in response to ownership of the data;

a processor interface operable to forward the initial update to memory request the processor interface operable to receive subsequent update to memory requests for the data from the plurality of processors, the processor interface operable to maintain a most recent subsequent update to memory request for the data;

a memory directory operable to receive the initial update to memory request, the memory directory operable to update the data in its associated home memory, the memory directory operable to generate an acknowledgment upon updating the data, the processor interface operable to forward the most recent subsequent update to memory request for the data to the memory directory for processing in response to the acknowledgment.

12. The system of claim 11, wherein the processor interface is operable to discard all but the most recent subsequent update to memory request.

13. The system of claim 11, wherein the initial update to memory request is an implicit writeback.

14. The method of claim 11, wherein the most recent subsequent update to memory is an implicit writeback.

15. The method of claim 14, wherein the processor interface is operable to receive new updates to memory requests for the data from the plurality of processors, the processor interface operable to maintain a most recent new update to memory request, the processor interface operable to receive an update acknowledgment corresponding to the most recent subsequent update to memory request indicating that the data has been updated in its home memory, the processor interface operable to forward the most recent new update to memory request to the memory directory for processing in response to the update acknowledgment.

16. The method of claim 11, wherein the most recent subsequent update to memory is a normal writeback.

17. The method of claim 16, wherein the processor interface is operable to receive new updates to memory requests for the data from the plurality of processors, the processor interface operable to receive an update acknowledgment corresponding to the most recent subsequent update to memory request indicating that the data has been updated in its home memory, the processor interface operable to forward the new updates to memory request to the memory directory in order for processing in response to the update acknowledgment.

18. The method of claim 11, wherein the memory directory is operable to receive a read request for the data from a remote processor prior to receiving the initial update to memory request, the memory directory operable to transfer an intervention request from the memory directory to the processor interface to obtain the data for the remote processor, the processor interface operable to provide the data to the remote processor prior to processing the initial update to memory request.

19. The method of claim 18, wherein the memory directory is operable to provide a speculative copy of the data to the remote processor.

20. The method of claim 18, wherein the remote processor obtains ownership of the data.

* * * * *